(12) United States Patent
Alnafaiy et al.

(10) Patent No.: US 12,502,256 B2
(45) Date of Patent: Dec. 23, 2025

(54) INTRAORAL SCANNING BODY

(71) Applicant: Imam Abdulrahman Bin Faisal University, Dammam (SA)

(72) Inventors: Sarah Mohammed Alnafaiy, Riyadh (SA); Ahmad Maniallah Al-Thobity, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 359 days.

(21) Appl. No.: 18/183,682

(22) Filed: Mar. 14, 2023

(65) Prior Publication Data

US 2024/0307155 A1    Sep. 19, 2024

(51) Int. Cl.
*A61C 8/00*    (2006.01)

(52) U.S. Cl.
CPC .................................. *A61C 8/0001* (2013.01)

(58) Field of Classification Search
CPC ............................ A61C 8/0001; A61C 9/0053
See application file for complete search history.

(56) References Cited

U.S. PATENT DOCUMENTS

| | | | | |
|---|---|---|---|---|
| 5,417,570 A * | 5/1995 | Zuest | ................. | A61C 13/2656 433/172 |
| 6,283,752 B1 * | 9/2001 | Kumar | ................. | A61C 8/0001 433/172 |
| 6,468,081 B2 * | 10/2002 | Yeung | ................. | A61C 8/0001 433/213 |
| 6,488,501 B1 * | 12/2002 | Harding | ............... | A61C 8/0001 433/214 |
| 6,769,913 B2 * | 8/2004 | Hurson | .................... | A61C 9/00 433/172 |
| 6,824,386 B2 * | 11/2004 | Halldin | ................ | A61C 8/0001 433/173 |
| 6,951,460 B2 * | 10/2005 | Halldin | ................ | A61C 8/0072 433/213 |
| 7,059,856 B2 * | 6/2006 | Marotta | ............. | A61C 13/0004 433/213 |
| 7,204,692 B2 * | 4/2007 | Klardie | ................ | A61C 8/0001 433/173 |

(Continued)

FOREIGN PATENT DOCUMENTS

| CN | 207979805 U | 10/2018 |
|---|---|---|
| EP | 3 552 574 A1 | 10/2019 |

*Primary Examiner* — Eric J Rosen
*Assistant Examiner* — Hao D Mai
(74) *Attorney, Agent, or Firm* — Oblon, McClelland, Maier & Neustadt, L.L.P.

(57) ABSTRACT

An intraoral scanning body having an inner piece, a middle piece encasing the inner piece, and an outer piece encasing the middle piece and the inner piece. Each of the inner piece and the middle piece defines three rectangular cuts on respective outer surfaces thereof. The middle piece and the outer piece are hollow cylinders, where a rectangular projection protrudes from inner surface of each of the middle piece and the outer piece. The rectangular projection of the middle piece engages with one of the rectangular cuts of the inner piece and the rectangular projection of the outer piece engages with one of the rectangular cuts of the middle piece. With such engagement, the intraoral scanning body achieves five different heights, each different height being able to be recognized by an intraoral scanner.

19 Claims, 4 Drawing Sheets

(56) References Cited

U.S. PATENT DOCUMENTS

| | | | |
|---|---|---|---|
| 2006/0084033 A1* | 4/2006 | Gittleman | A61C 8/0001 433/173 |
| 2008/0032263 A1* | 2/2008 | Bondar | A61C 8/0066 433/141 |
| 2010/0092921 A1* | 4/2010 | Huffman | A61C 13/12 29/256 |
| 2010/0248180 A1* | 9/2010 | Bondar | A61C 8/0001 433/144 |
| 2012/0214130 A1* | 8/2012 | Krivoruk | A61C 13/0001 433/173 |
| 2013/0196290 A1* | 8/2013 | Herrington | A61C 8/008 433/173 |
| 2013/0289950 A1* | 10/2013 | Kopelman | A61C 13/0004 703/1 |
| 2014/0080095 A1 | 3/2014 | Suttin et al. | |
| 2015/0030993 A1* | 1/2015 | von Malottki | A61C 8/0066 433/173 |
| 2016/0128813 A1* | 5/2016 | Scharfe Thomsen | A61C 8/0001 433/213 |
| 2016/0250008 A1* | 9/2016 | Brun | A61C 13/0019 433/213 |
| 2018/0214253 A1* | 8/2018 | Guerra | A61C 8/0066 |
| 2018/0368949 A1 | 12/2018 | Suttin et al. | |
| 2022/0296342 A1 | 9/2022 | Robb et al. | |

* cited by examiner

INTRAORAL SCANNING BODY

BACKGROUND

Technical Field

The present disclosure generally relates to digital implant dentistry and more particularly relates to an intraoral implant scanning body and method of making and using the intraoral implant scanning body.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In digital implant dentistry, dental implant surgical guides are used to transfer treatment plans into surgical procedures. The dental implant surgical guides are made to fit the patients' anatomical structures. The treatment plans play a key role in determining the design of surgical guides as well as the manufacturing approaches.

Dental restorations, such as crowns and bridges, mounted to dental implants are designed and manufactured based on digitalization by means of an intraoral scanner, among other methods. Digitalization, done either directly on the mouth of a patient or more conventionally by means of an impression of the patient's mouth, allows the design and manufacture of dental structures with highly precise adjustments and a quality superior to that of traditional casting systems. The intraoral scanner scans a recognizable feature on the surface of the intraoral scanning body to provide precise information of the position and orientation of the intraoral scanning body, and thereby also provide information of the position and orientation of the dental implant or implant analog, so as to enable the manufacture of a custom abutment that fits precisely onto the dental implant.

With the development of technology, dentistry has evolved to be entirely digitalized, trying to revolutionize the quality of health care by reducing the operation time and increasing the productivity level. Digital technology of dentistry incorporates computer-guided components into dental practice, such as computer-aided design and computer-aided manufacturing (CAD/CAM) systems, which are used to design and fabricate dental prosthesis digitally. To fabricate any dental prosthesis digitally, the first step is transferring a position of a tooth/implant to a computer to design the dental prosthesis using digital impression/scanning. Such digital impression/scanning replaces the conventional impression that uses dental impression materials, thereby improving the patient's acceptance and comfort. The digital impression/scanning also makes it more pleasant for patients with gag reflexes or fears from any dental treatment.

Intraoral scanning reduces the errors that could occur during an impression-making procedure or laboratory phases. Other advantages include improved reproducibility and reliability, increasing the popularity of the digital workflow (Güth et al., 2013, '*Accuracy of digital models obtained by direct and indirect data capturing*', Clinical Oral Investigations. Clin Oral Investig, 17(4), pp. 1201-1208; and Yuzbasioglu et al., 2014, '*Comparison of digital and conventional impression techniques: evaluation of patients' perception, treatment comfort, effectiveness, and clinical outcomes*'. BMC oral health, 14, 10). In order to transfer the position of the dental implant from the patient's mouth to the computer, a special component, such as the intraoral scanning body should be placed into the dental implant to be scanned and a three-dimensional (3-D) picture is produced in the computer. Characteristics of the intraoral scanning body play an important role in the accuracy of the digital impression/scanning. The characteristics include, but are not limited to, height, material, surface type, and connection type.

Studies have shown that height of the intraoral scanning body affects the accuracy of the digital impression/scanning, and thus affect the fit of a final dental prosthesis. Studies have also shown that digital scans of a short intraoral scanning body of 6 mm to 10 mm height are more accurate than long or extremely short intraoral scanning body, regardless of the material type (See: Gómez-Polo et al., 2022, '*Influence of implant angulation and clinical implant scan body height on the accuracy of complete arch intraoral digital scans*'. The Journal of prosthetic dentistry, S0022-3913(21)00651-X. Advance online publication; and Mizumoto and Yilmaz, 2018, '*Intraoral scan bodies in implant dentistry: A systematic review*', Journal of Prosthetic Dentistry. Mosby Inc., pp. 343-352). However, in cases of deep or shallow dental implants, the use of such intraoral scanning bodies may be contraindicated or even impossible. Short intraoral scanning bodies have been shown to have inadequate optical digital detection of the acquired scanning points in cases of deep implants. On the other hand, shallow dental implants with a long intraoral scanning body increased scanning errors due to the large scanning area, thereby affecting the accuracy of the scan. Moreover, in cases of patients with limited mouth opening, the use of the available intraoral scanning bodies may be impossible due to the difficulty of the insertion of a tip of the intraoral scanner with the long intraoral scanning body together.

Each of the aforementioned patent references suffers from one or more drawbacks hindering their adoption. Accordingly, it is one object of the present disclosure to provide a reusable intraoral scanning body for use in cases of shallow/deep implants, or patients with limited mouth opening.

SUMMARY

According to one aspect of the present disclosure, an intraoral scanning body is provided. The intraoral scanning body includes an inner piece, a middle piece, and an outer piece. The inner piece is in a form of a solid cylinder and has a screw protruding from a bottom end face thereof. The solid cylinder includes a cylindrical volume and defines three-horizontal rectangular cuts on an outer surface thereof, where each rectangular cut is spaced from an adjacent rectangular cut and extends perpendicular to a longitudinal axis of the solid cylinder. The screw is in axial alignment with the longitudinal axis of the solid cylinder. The middle piece is in a form of a first hollow cylinder having a first rectangular projection protruding along an inner surface thereof. The first hollow cylinder encases the solid cylinder and defines three-horizontal rectangular cuts an outer surface thereof, where each rectangular cut is spaced from an adjacent rectangular cut and extends perpendicular to a longitudinal axis of the first hollow cylinder. The outer piece is in a form of a second hollow cylinder having a second rectangular projection and a cutout. The second hollow cylinder encases the first hollow cylinder and the solid cylinder. The second rectangular projection protrudes along an inner surface of the outer piece and the cutout is defined on an outer surface of the outer piece. The cutout defines an asymmetrical notch on the outer surface of the outer piece.

In some embodiments, the inner piece, the middle piece, and the outer piece include a carbon fiber-reinforced polyetheretherketone (PEEK) material.

In some embodiments, the asymmetrical notch is in a form of a semicircle shape that includes a spherical divot. The semicircle shape is disposed at a ridgeline of the outer surface of the outer piece, where the ridgeline is an intersection of a top end face of the outer piece and the outer surface of the outer piece. The top end face of the outer piece and the bottom end face of the inner piece are at opposing ends of the intraoral scanning body.

In some embodiments, the three-horizontal rectangular cuts of the inner piece and the three-horizontal rectangular cuts of the middle piece are spaced equally from corresponding adjacent cuts.

In some embodiments, the intraoral scanning body has a cylindrical oval outer shape.

In some embodiments, the intraoral scanning body includes a scanning feature configured to be recognized by an intraoral scanner.

According to another aspect of the present disclosure, a dental implant system is provided. The dental implant system includes intraoral scanning body and a dental implant fixture. The dental implant fixture is affixed to and is covered by the bottom end face of a cylindrical surface of the intraoral scanning body. The dental implant fixture is affixed to the intraoral scanning body through an engagement section configured to releasably engage with the dental fixture.

In some embodiments, the engagement section of the intraoral scanning body is affixed to the dental implant fixture by a friction force exerted upon the engagement section of the intraoral scanning body by the dental implant fixture.

In some embodiments, the engagement section is attached to the dental implant fixture via a rotational insertion. The engagement section includes a metal pin with incised threads, where the dental implant fixture contains a corresponding component complimentary to the metal pin with incised threads.

In some embodiments, a material of the engagement section is a biocompatible metal material.

According to yet another aspect of the present disclosure, an adjustable intraoral scanning body is provided. The adjustable intraoral scanning body includes an inner piece, a middle piece, and an outer piece. The inner piece defines three-horizontal rectangular cuts on an outer surface of the inner piece, where each rectangular cut extends perpendicular to a longitudinal axis of the adjustable intraoral scanning body. The middle piece defines three-horizontal rectangular cuts an outer surface thereof, where each rectangular cut extends perpendicular to the longitudinal axis of the adjustable intraoral scanning body. A first rectangular projection is disposed on an inner surface of the middle piece and a second rectangular projection is disposed on an inner surface of the outer piece. A curved face of the adjustable intraoral scanning body is configured to deform upon a compressive force and form a deformation in the curved face, where is deformation is located on the outer piece and the middle piece. The deformation of the middle piece generates a path of adjustment along a longitudinal axis of the inner piece and the deformation of the outer piece generates a path of adjustment along a longitudinal axis of the middle piece. A sliding action on the path of adjustment along the longitudinal axis of the inner piece and middle piece results in a distinct height of the adjustable intraoral scanning body. The first projection and the second projection locks into the horizontal rectangular cuts of the inner piece and the middle piece, respectively. A force is applied to the first projection until the first projection locks into the three-horizontal rectangular cuts of the inner piece and a force is applied to the second projection until the second projection locks into the three-horizontal rectangular cuts of the middle piece.

In some embodiments, the first rectangular projection locks into one of the three-horizontal rectangular cuts of the inner piece and the second rectangular projection locks into one of the three-horizontal rectangular cuts of the middle piece via a transition fit.

In some embodiments, the three-horizontal rectangular cuts of the inner piece, the three-horizontal rectangular cuts of the middle piece, the first projection, and the second projection provide five distinct heights of the adjustable intraoral scanning body.

In some embodiments, the adjustable intraoral scanning body is configured to be adjustable within a height range of 5 millimeters to 13 millimeters.

In some embodiments, the inner piece, the middle piece, and the outer piece are of equal height.

In some embodiments, the three-horizontal rectangular cuts of the inner piece are aligned with the first projection, and the three-horizontal rectangular cuts of the middle piece are aligned with the second projection.

In some embodiments, the adjustable intraoral scanning body includes a scanning feature configured to be recognized by an intraoral scanner.

In some embodiments, the three-horizontal rectangular cuts of the inner piece and the three-horizontal rectangular cuts of the middle piece are spaced equally from a corresponding adjacent cut.

In some embodiments, the adjustable intraoral scanning body has a cylindrical oval outer shape.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to dental implants and prosthetics, and more particularly to intraoral digital implant scanning. Specifically, the present disclosure provides a three-piece intraoral scanning body that may be set to five different heights so as to be used with shallow/deep implants, or patients with limited mouth opening, to facilitate and improve the digital scanning process.

Figure 1:
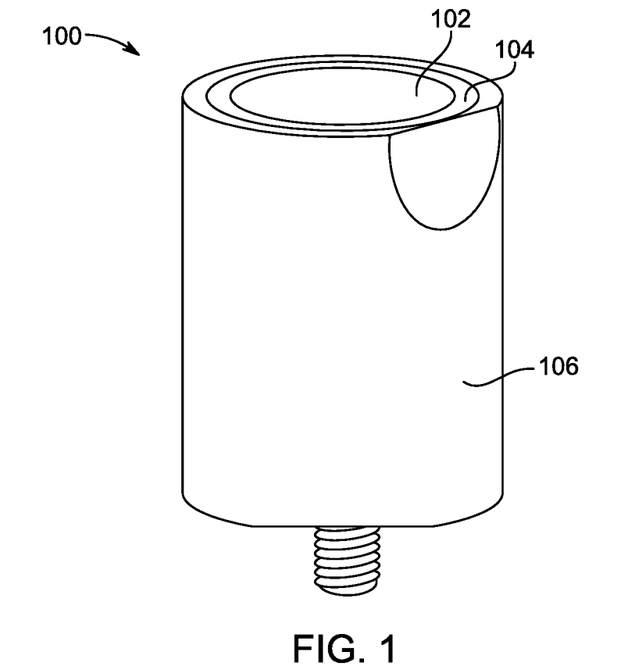
FIG. 1 illustrates an exemplary perspective cross-sectional view of an intraoral scanning body, according to an aspect of the present disclosure.

FIG. 1 illustrates an exemplary perspective cross-sectional view of an intraoral scanning body 100, according to an aspect of the present disclosure. The intraoral scanning body 100 (alternatively referred to as an adjustable intraoral scanning body 100 in the present disclosure) includes an inner piece 102, a middle piece 104, and an outer piece 106, where the middle piece 104 encases the inner piece 102 and the outer piece 106 encases the middle piece 104 as shown in FIG. 1. In some embodiments, the intraoral scanning body 100 may have a cylindrical oval outer shape. In another embodiment, an outer surface of the inner piece 102 may be directly adjacent and in continuous contact with an inner surface of the middle piece 104. In an embodiment the inner surface of the middle piece 104 may be held against the outer surface of the inner piece via a friction fit and an outer surface of the middle piece 104 may be held against an inner surface of the outer piece 106 via the friction fit.

Figure 2:
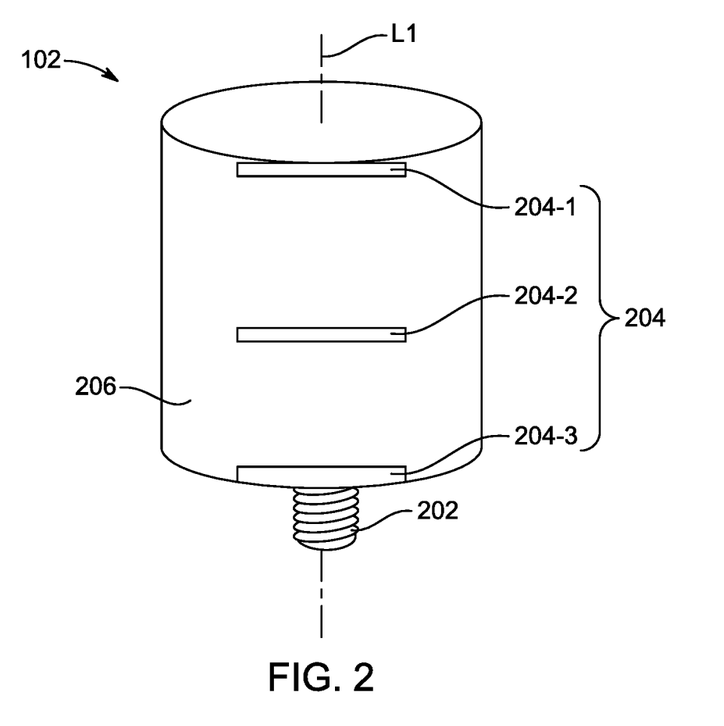
FIG. 2 illustrates a perspective view of an inner piece of the intraoral scanning body of FIG. 1, according to an aspect of the present disclosure.

FIG. 2 illustrates a perspective view of the inner piece 102 of the intraoral scanning body 100, according to an aspect of the present disclosure. The inner piece 102 is embodied as a solid cylinder having a screw 202 protruding from a flat bottom end face (hidden in FIG. 2) thereof. The inner piece 102 is alternatively referred to as the solid cylinder in the present disclosure. In an embodiment, a height of the inner piece 102 may be in a range of about 4 mm to about 8 mm, preferably from about 5 mm to about 7 mm, from about 5.5 to 6.5 mm, or about 5 mm. The inner piece 102 defines at least three-horizontal rectangular cuts, such as a first cut 204-1, a second cut 204-2, and a third cut 204-3 (collectively referred to as "the rectangular cuts 204" of the inner piece 102), on an outer surface 206 thereof. As seen in FIG. 2, the rectangular cuts 204 are spaced along the outer surface 206 and each of the rectangular cuts 204 extend perpendicular to a longitudinal axis "L1" of the inner piece 102. In some embodiments, the rectangular cuts 204 are of equal size and shape and may be equally spaced on the outer surface 206. As used herein, the term "equally spaced" refers to equal distance between two adjacent cuts of the rectangular cuts 204. In an embodiment, a distance between adjacent rectangular cuts 204 may be about 2 mm, preferably in a range of from about 1.5 to about 2.5 mm. The screw 202 is disposed in axial alignment with the longitudinal axis "L1" of the inner piece 102. In some embodiments, the screw 202 may extend from a central portion of the flat bottom end face. For example, the screw 202 may extend a central longitudinal axis of the inner piece 102. Typically the portion of the screw extending from the bottom face has a length that is less that a height of the solid cylinder.

Figure 3A:
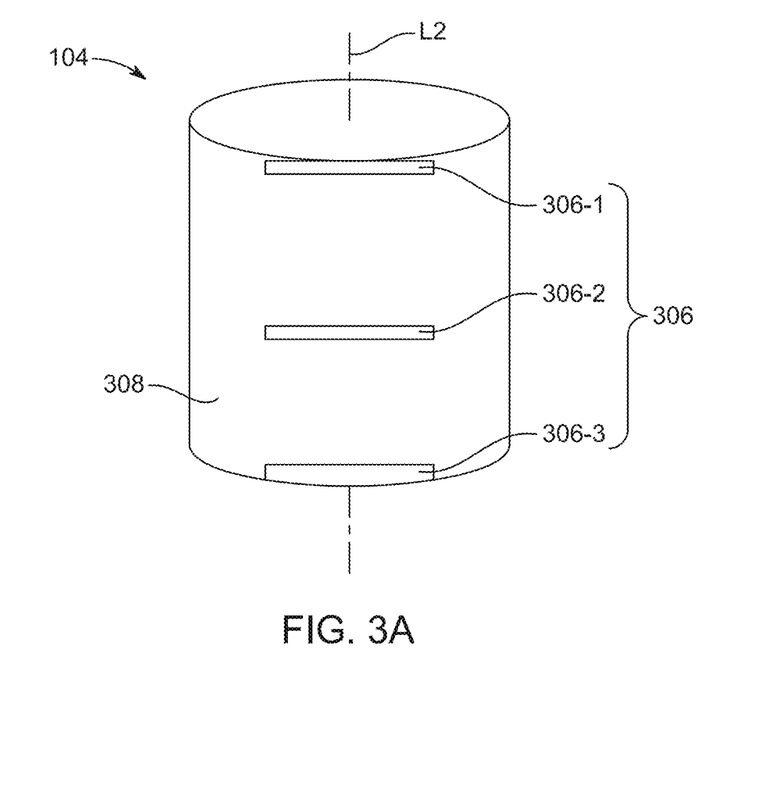
FIG. 3A illustrates a perspective view of a middle piece of the intraoral scanning body of FIG. 1, according to an aspect of the present disclosure.
Figure 3B:
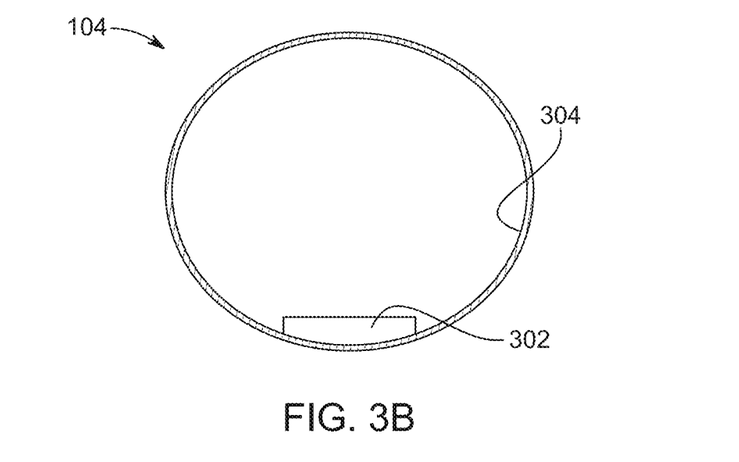
FIG. 3B illustrates a cross-section of the middle piece, according to an aspect of the present disclosure.

FIG. 3A illustrates a perspective view of the middle piece 104 of the intraoral scanning body 100 and FIG. 3B illustrates a top view of the middle piece 104, according aspects of the present disclosure. The middle piece 104 is embodied as a first hollow cylinder having a first rectangular projection 302 that protrudes from an inner surface 304 thereof. In an embodiment, a height of the middle piece 104 may be in a range of about 4 mm to about 8 mm, preferably from about 5 mm to about 7 mm, from about 5.5 to 6.5 mm, or about 5 mm. Owing to the hollow structure, the middle piece 104 is configured to encase the inner piece 102. The middle piece 104 defines three-horizontal rectangular cuts, such as first cut 306-1, a second cut 306-2, and a third cut 306-3 (collectively referred to as "the rectangular cuts 306" of the middle piece 104), on an outer surface 308 thereof. As seen in FIG. 3A, the rectangular cuts 306 are spaced along the outer surface 308 and each of the rectangular cuts 306 extend perpendicular to a longitudinal axis "L2" of the middle piece 104. In some embodiments, the rectangular cuts 306 are of equal size and shape and may be equally spaced on the outer surface 308. In an embodiment, a distance between adjacent rectangular cuts 306 may be about 2 mm, preferably in a range of from about 1.5 to about 2.5 mm. In another embodiment, the bottom face of the middle piece 104 may a flat circular shape and the top face of the middle piece 104 may be a flat circular shape.

Figure 4A:
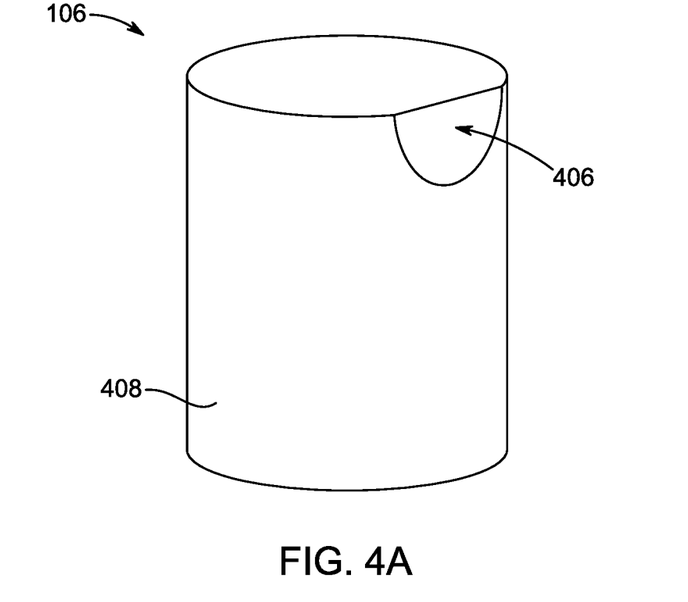
FIG. 4A illustrates a perspective view of an outer piece of the intraoral scanning body of FIG. 1, according to an aspect of the present disclosure.
Figure 4B:
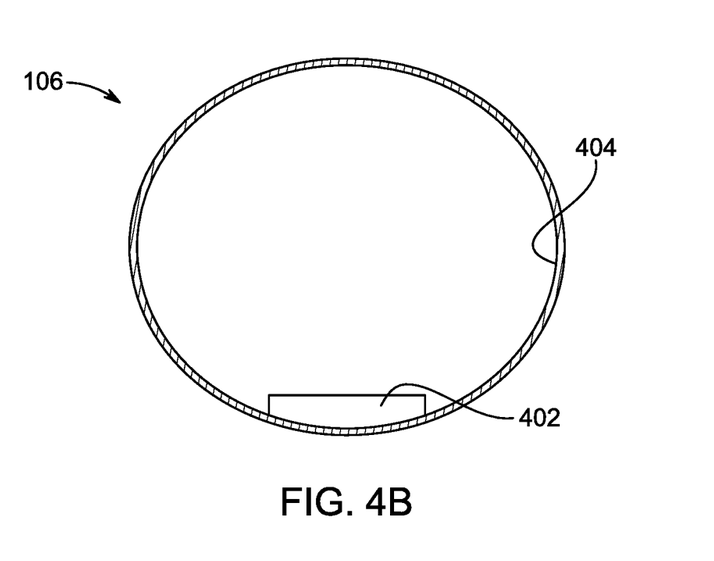
FIG. 4B illustrates a cross-section of the outer piece, according to an aspect of the present disclosure.

FIG. 4A illustrates a perspective view of the outer piece 106 of the intraoral scanning body 100 and FIG. 4B illustrates a top view of the outer piece 106, according to aspects of the present disclosure. The outer piece 106 is embodied as a second hollow cylinder having a second rectangular projection 402 that protrudes from an inner surface 404 thereof. Owing to the hollow structure, the outer piece 106 is configured to encase the inner piece 102 and the middle piece 104. The outer piece 106 also defines a cutout 406 located on a curved outer surface 408 thereof. The cutout 406 includes an asymmetrical notch on the curved outer surface 408 of the outer piece 106. In some embodiments, the asymmetrical notch may be in form of a semicircle shape that includes a convex spherical divot, as shown in FIG. 4A. The asymmetrical notch is located at a ridgeline of the curved outer surface 408 of the outer piece 106. The ridgeline refers to an intersection of a flat top end face of the outer piece 106 and the curved outer surface 408 of the outer piece 106, where the flat top end face of the outer piece 106 and the flat bottom end face of the inner piece 102 are opposing ends of the intraoral scanning body 100. The cutout 406 helps to index the intraoral scanning body 100 and improve a surface recognition performed by, for example, a CAD software. In an embodiment, the cutout 406 may be etched on the curved outer surface 408 of the outer piece 106 in a range of one third to one half of a longitudinal height of the curved outer surface 408 of the outer piece 106.

In an embodiment, the inner piece 102, the middle piece 104, and the outer piece 106 may comprise a carbon fiber-reinforced polyetheretherketone (PEEK) material. The intraoral scanning body 100 includes a scanning feature configured to be recognized by an intraoral scanner. In a virtual implant treatment planning, the intraoral scanning or dental cast scanning and cone beam computed tomography (CBCT) may be together used with the CAD software and in-office stereolithographic 3-D printers to complete a dental implant therapy. The intraoral scanner may use a commercially available implant treatment planning software which is configured to optimize implant positioning and enhance implant placement accuracy through fabrication of an implant guide and its use in guided implant surgery.

According to an aspect of the present disclosure, a curved face of the adjustable intraoral scanning body 100 is configured to deform upon a compressive force and form a deformation in a curved face thereof, such that the deformation is present in the outer piece 106 and the middle piece 104. The deformation of the middle piece 104 generates a path of adjustment along the longitudinal axis "L1" of the inner piece 102 and the deformation of the outer piece 106 generates a path of adjustment along the longitudinal axis "L2" of the middle piece 104. A sliding action on the path of adjustment along the longitudinal axes "L1" and "L2" of the inner piece 102 and middle piece 104, respectively, results in a distinct adjustable height of the intraoral scanning body 100. The first rectangular projection 302 is configured to lock into one of the rectangular cuts 204 of the inner piece 102 and the second rectangular projection 402 is configured to lock into one of the rectangular cuts 306 of the middle piece 104. In an assembled condition, the rectangular cuts 204 of the inner piece 102 are aligned with first rectangular projection 302 of the middle piece 104 and the rectangular cuts 306 of the middle piece 104 are aligned with the second rectangular projection 402 of the outer piece 106. The movement in between the rectangular cuts of the inner piece 102 and the middle piece 104 is easy due to the elasticity of the carbon fiber-reinforced PEEK material.

For the purpose of such locking, a force is applied to the first rectangular projection 302 until the first rectangular projection 302 locks into one of the rectangular cuts 204 of the inner piece 102 and another force is applied to the second rectangular projection 402 until the second rectangular projection 402 locks into one of the rectangular cuts 306 of the middle piece 104. In an embodiment, the locking of the first rectangular projection 302 into one of the rectangular cuts 204 of the inner piece 102 and the locking of the second rectangular projection 402 into one of the rectangular cuts 306 of the middle piece 104 may result in a transition fit.

In an embodiment, each of the inner piece 102 (not inclusive of the screw), the middle piece 104, and the outer piece 106 may be of equal height. In an aspect, the rectangular cuts 204 of the inner piece 102, the rectangular cuts 306 of the middle piece 104, the first rectangular projection 302, and the second rectangular projection 402 together are configured to achieve five distinct heights of the adjustable intraoral scanning body 100. In some embodiments, the five distinct heights may be within a range of about 5 millimeters to about 13 millimeters.

Figure 5:
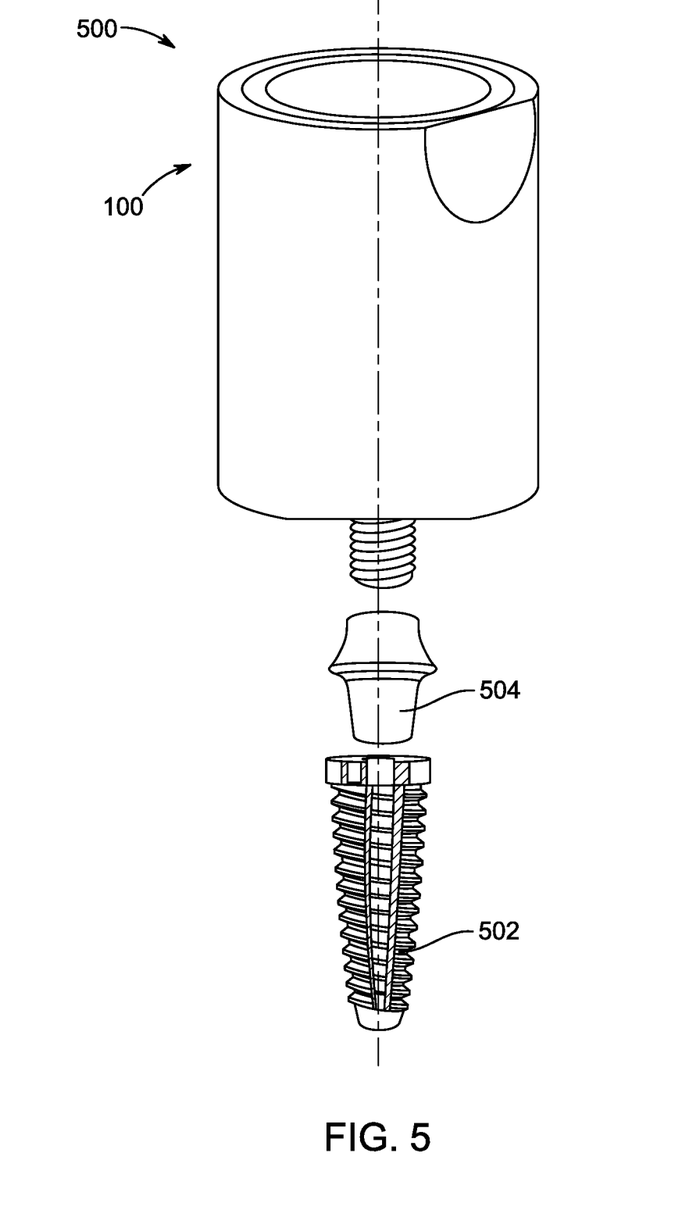
FIG. 5 illustrates a dental implant system, according to an aspect of the present disclosure.

According to an aspect of the present disclosure, a dental implant system 500 is provided and illustrated in FIG. 5. The dental implant system 500 includes the intraoral scanning body 100 and a dental implant fixture 502 affixed to and covered by the flat bottom end face of the intraoral scanning body 100. Specifically, the dental implant fixture 502 is affixed to the intraoral scanning body 100 through an engagement section 504. In an example, the engagement section 504 may be configured to releasably engage with the dental implant fixture 502. As used herein, the term "dental implant fixture" may refer to a screw post that is inserted into a jaw of an oral cavity of a patient, where the screw post supports a dental prosthetics thereon. As such, a material of the dental implant fixture 502 is preferably a biocompatible metal material.

In an embodiment, the engagement section 504 may be affixed to the dental implant fixture 502 by a friction force exerted upon the engagement section 504 by the dental implant fixture 502. For example, a press fit may help achieve an engagement between the engagement section 504 and the dental implant fixture 502. In another example, a rotational fit may help achieve the engagement between the engagement section 504 and the dental implant fixture 502. In some embodiments, the engagement section 504 may be attached to the dental implant fixture 502 via a rotational insertion. For example, the engagement section 504 may be threadably fastened to the dental implant fixture 502. The engagement section 504 may include a metal pin with incised threads and the dental implant fixture 502 may include a corresponding component with incised threads complimentary to that of the metal pin. As such, the engagement section 504 may be fastened to the dental implant fixture 502. In an example, the engagement section 504 may be made of a biocompatible metal material.

To this end, the present disclosure provides a three-piece carbon fiber-reinforced PEEK material based intraoral scanning body 100 that may be configured to five different heights, such as 5 mm, 7 mm, 9 mm, 11 mm, and 13 mm heights. Based on a depth of a dental implant, a clinician may choose one of the five heights using the same intraoral scanning body 100. Thus, requirement of intraoral scanning bodies of different heights may be eliminated, thereby rendering the intraoral scanning body 100 cost-effective. Additionally, the carbon fiber-reinforced PEEK material exhibits high wear resistance and strength compared to the conventional PEEK material for long-term use. Moreover, the carbon fiber-reinforced PEEK material can withstand high degrees of temperature, and therefore may be subjected to sterilization as compared to the conventional PEEK material.

Numerous modifications and variations of the present invention are possible in light of the above teachings. It is, therefore, to be understood that, within the scope of the appended claims, the invention may be practiced otherwise than as specifically described herein.

The invention claimed is:

1. An intraoral scanning body (ISB) comprising:
an inner piece, a middle piece, and an outer piece,
wherein the inner piece is in a form of a solid cylinder having a screw protruding from a bottom end face;
the solid cylinder having a cylindrical volume, having three-horizontal rectangular cuts perpendicular to a longitudinal axis of the solid cylinder disposed into an outer surface of the solid cylinder,
the three-horizontal rectangular cuts being spaced along the outer surface of the solid cylinder, the screw being in axial alignment with the longitudinal axis of the solid cylinder, wherein the middle piece is in the form of a first hollow cylinder having a first rectangular projection protruding along an inner surface of the middle piece, the first hollow cylinder encasing the solid cylinder, the first hollow cylinder having three-horizontal rectangular cuts perpendicular to the longitudinal axis of the first hollow cylinder and disposed into an outer surface of the first hollow cylinder, the three-horizontal rectangular cuts being spaced along the outer surface of the first hollow cylinder, wherein the outer piece is in the form of a second hollow cylinder having a second rectangular projection and a cutout, the second hollow cylinder encasing the first hollow cylinder and the solid cylinder, the second rectangular projection protruding along an inner surface of the outer piece, the cutout being disposed on an outer surface of the outer piece, the cutout comprising an asymmetrical notch on the outer surface of the outer piece.

2. The intraoral scanning body of claim 1, wherein the inner piece, the middle piece, and the outer piece comprise a carbon fiber-reinforced polyetheretherketone (PEEK) material.

3. The intraoral scanning body of claim 1, wherein the asymmetrical notch is in the form of a semicircle shape, wherein the semicircle shape contains a spherical divot, the semicircle shape being disposed at a ridgeline of the outer surface of the outer piece, the ridgeline being an intersection of a top end face of the outer piece and the outer surface of the outer piece, wherein the top end face of the outer piece and the bottom end face of the inner piece are at opposing ends of the ISB.

4. The intraoral scanning body of claim 1, wherein the three-horizontal rectangular cuts of the inner piece and the three-horizontal rectangular cuts of the middle piece are equally spaced.

5. The intraoral scanning body of claim 1, wherein the ISB has a cylindrical oval outer shape.

6. The intraoral scanning body of claim 1, wherein the ISB comprises a scanning feature configured to be recognized by an intraoral scanner.

7. A dental implant system, comprising:
the ISB of claim 1 and a dental implant fixture, wherein the dental implant fixture is affixed to and is covered by the bottom end face of the ISB, and
wherein the dental implant fixture is affixed to the ISB through an engagement section configured to releasably engage with the dental implant fixture.

8. The dental implant system of claim 7, wherein the engagement section of the ISB is affixed to the dental implant fixture by a friction force exerted upon the engagement section of the ISB by the dental implant fixture.

9. The dental implant system of claim 7, wherein the engagement section is attached to the dental implant fixture via a rotational insertion,
the engagement section comprising a metal pin with incised threads,
wherein the dental implant fixture contains a corresponding component complimentary to the metal pin with incised threads.

10. The dental implant system of claim 7, wherein a material of the engagement section is a biocompatible metal material.

11. An adjustable intraoral scanning body (adjustable ISB), comprising:
an inner piece, a middle piece, and an outer piece,
the inner piece having three-horizontal rectangular cuts perpendicular to a longitudinal axis of the adjustable ISB disposed into an outer surface of the inner piece,
the middle piece having three-horizontal rectangular cuts perpendicular to the longitudinal axis of the adjustable ISB disposed into an outer surface of the middle piece,
wherein a first rectangular projection is disposed on an inner surface of the middle piece,
wherein a second rectangular projection is disposed on an inner surface of the outer piece,
wherein a curved face of the adjustable ISB is configured to deform upon a compressive force and form a deformation in the curved face,
the deformation present in the outer piece and the middle piece,
wherein the deformation of the middle piece generates a path of adjustment along a longitudinal axis of the inner piece,
wherein the deformation of the outer piece generates a path of adjustment along a longitudinal axis of the middle piece,
wherein a sliding action on the path of adjustment along the longitudinal axis of the inner piece and middle piece results in a distinct adjustable ISB height,
the first projection and second projection locking into the horizontal rectangular cuts of the inner piece and the middle piece respectively,
wherein a force is applied to the first projection until the first projection locks into the three-horizontal rectangular cuts of the inner piece,
wherein a force is applied to the second projection until the second projection locks into the three-horizontal rectangular cuts of the middle piece.

12. The adjustable ISB of claim 11, wherein the first rectangular projection locks into one of the three-horizontal rectangular cuts of the inner piece and wherein the second rectangular projection locks into one of the three-horizontal rectangular cuts of the middle piece via a transition fit.

13. The adjustable ISB of claim 12, wherein the three-horizontal rectangular cuts of the inner piece, the three-horizontal rectangular cuts of the middle piece, the first rectangular projection, and the second rectangular projection provide five distinct ISB heights measured from a bottom end face to a highest top end surface.

14. The adjustable ISB of claim 11, wherein the adjustable ISB is configured to be adjustable within a height range of 5 millimeters to 13 millimeters.

15. The adjustable ISB of claim 11, wherein the inner piece, the middle piece, and the outer piece are of equal height.

16. The adjustable ISB of claim 11, wherein the three-horizontal rectangular cuts of the inner piece are aligned with first rectangular projection, and wherein the three-horizontal rectangular cuts of the middle piece are aligned with the second rectangular projection.

17. The adjustable ISB of claim 11, wherein the adjustable ISB comprises a scanning feature configured to be recognized by an intraoral scanner.

18. The adjustable ISB of claim 11, wherein the three-horizontal rectangular cuts of the inner piece and the three-horizontal rectangular cuts of the middle piece are equally spaced.

19. The adjustable ISB of claim 11, wherein the adjustable ISB has a cylindrical oval outer shape.

\* \* \* \* \*